(12) United States Patent
Allamaraju et al.

(10) Patent No.: US 7,647,644 B2
(45) Date of Patent: Jan. 12, 2010

(54) ENTITLEMENT DESIGNATION IN WEB SERVICES FOR REMOTE PORTLETS ENVIRONMENT

(75) Inventors: Subrahmanyam Allamaraju, Longmont, CO (US); Sameer Sawant, Boulder, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 730 days.

(21) Appl. No.: 11/169,557

(22) Filed: Jun. 29, 2005

(65) Prior Publication Data

US 2007/0006318 A1    Jan. 4, 2007

(51) Int. Cl.
*H04L 9/00* (2006.01)
*G06F 7/04* (2006.01)
*H04L 9/32* (2006.01)

(52) U.S. Cl. .............. 726/27; 726/28; 726/29; 726/30; 713/151; 713/152; 713/153; 709/225; 709/226; 709/227; 709/228

(58) Field of Classification Search .......... 726/27
See application file for complete search history.

(56) References Cited

U.S. PATENT DOCUMENTS

| | | | |
|---|---|---|---|
| 6,564,251 B2 | 5/2003 | Katariya et al. | |
| 6,845,394 B2 | 1/2005 | Ritche | |
| 7,346,923 B2 * | 3/2008 | Atkins et al. | 726/6 |
| 2002/0169852 A1 | 11/2002 | Schaeck | |
| 2003/0167315 A1 | 9/2003 | Chowdhry et al. | |
| 2004/0054749 A1 | 3/2004 | Doyle et al. | |
| 2005/0080768 A1 | 4/2005 | Zhang et al. | |
| 2006/0004913 A1 | 1/2006 | Chong | |
| 2006/0031377 A1 | 2/2006 | Ng et al. | |

OTHER PUBLICATIONS

Schaeck, T., Web Services for Remote Portals (WSRP) Whitepaper, Sep. 22, 2002, pp. 1-18.
Negus, C. et al., Linux Troubleshooting Bible, 2004, Wiley Publishing, Inc. pp. 40, 42.
SmartComputing, Nov. 2002, [online], [retrieved on Nov. 7, 2008]. Retrieved from www.smartcomputing.com/editorial/article.asp?article=articles%2F2002%2Fs1311%2F59s11web%2F59s11web.asp, pp. 1-4.

* cited by examiner

*Primary Examiner*—Longbit Chai
(74) *Attorney, Agent, or Firm*—Fliesler Meyer LLP

(57) ABSTRACT

A consumer system is registered on a producer system, which can be accomplished by submitting one or more registration values. The producer system checks each application according to acceptable registration values for each application. A set of applications that are available is generated according to which applications have permissions associated with the submitted registration values. The set is then presented to the consumer system, which can utilize applications on the set.

17 Claims, 4 Drawing Sheets

ENTITLEMENT DESIGNATION IN WEB SERVICES FOR REMOTE PORTLETS ENVIRONMENT

CROSS REFERENCE TO RELATED APPLICATIONS

The following commonly owned, co-pending U.S. patents and patent applications, including the present application, are related to each other. Each of the other patents/applications are incorporated by reference herein in its entirety:

U.S. patent application Ser. No. 11/169,557, entitled ENTITLEMENT DESIGNATION IN WEB SERVICES FOR REMOTE PORTLETS ENVIRONMENT, by Subrahmanyam Allamaraju et al., filed on Jun. 29, 2005;

U.S. patent application Ser. No. 11/172,253, entitled SYSTEM AND METHOD FOR A WEB SERVICE PORTLET REGISTRY, by Subrahmanyam Allamaraju, filed on Jun. 30, 2005;

U.S. patent application Ser. No. 11/170,884entitled SYSTEM AND METHOD FOR PUBLISHING TO A WEB SERVICE PORTLET REGISTRY, by Subrahmanyam Allamaraju, filed on Jun. 30, 2005; and U.S. patent application Ser. No. 11/170,053, entitled SYSTEM AND METHOD FOR DELIVERING GROUPED WEB SERVICE APPLICATIONS, by Subrahmanyam Allamaraju et al., filed on Jun. 29, 2005.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Conventionally, web portals, which provide access to a variety of applications and content through a single location, have become an increasingly popular means for delivering applications and information. Whereas previously, web portals were used to deliver a relatively limited amount of functionality, they have become an increasingly popular means for delivering functional applications to local and global communities.

While many custom applications have been developed for use with web portals, an ongoing concern has been the need to develop an applications infrastructure for supporting more complex applications. Various mechanisms have been proposed to address this issue. The Web Services for Remote Portlets (WSRP) standard from the Oasis Group establishes a framework whereby applications can be presented on a page without the need for a support apparatus for the application on the server delivering the page.

However, conventional implementations of WSRP are limited in their ability to perform authentication or otherwise control access to portlets. For example, current approaches allow a system to require registration before utilizing its applications, but lack means for controlling access on a per-application basis.

What is needed is an improved system of controlling access to applications that can be utilized remotely.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

The present application discloses mechanisms and methods for controlling access to applications that can be utilized remotely. Embodiments that provide control of access to applications that can be utilized remotely. This control of access to applications that can be utilized remotely can enable web servers to serve pages that utilize remote applications, for example.

According to embodiments of the present invention, a consumer system is registered on a producer system, which can be accomplished by submitting one or more registration values. As used herein, the term "consumer" refers to a system that is configured to present applications that are located externally. A consumer typically offers one or more pages on an internal web portal that can be used to present remote applications. A consumer system utilizes applications that are stored on a remote producer system. As used herein, the term "producer" refers to a system that offers one or more applications that can be presented on a consumer page while residing on the producer. A service request is then submitted to the producer. The producer system checks each application according to acceptable registration values for each application. A set of applications that are available is generated according to which applications have permissions associated with the submitted registration values. The set is then presented to the consumer system, which can utilize applications on the set.

Figure 1:
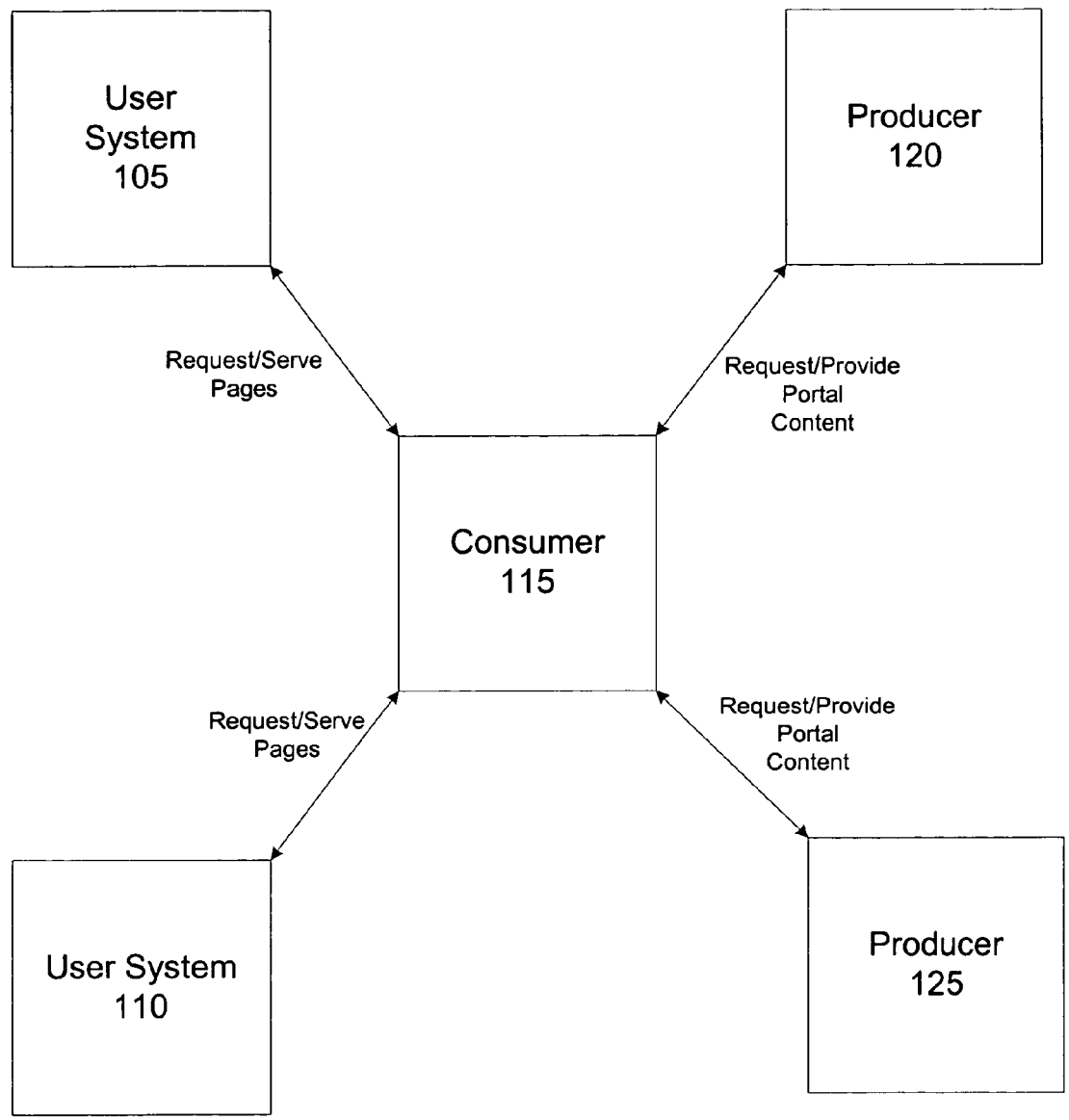
FIG. 1 is a block diagram illustrating one embodiment of an interaction between a producer, a consumer, and a user system.

FIG. 1 illustrates an overview of the interaction between a consumer system, user systems, and producer systems in an embodiment. Producer systems 120, 125 can store one or more portlet applications that are utilized by user systems 105, 110 through a consumer system 115. In some embodiments, the producer systems can maintain web portals. In alternate embodiments, the producer systems perform other functions or merely serve to provide access to portlets. The user systems 105, 110 are systems remote to the consumer 115 that are utilized by end users and include web page viewing capabilities.

The consumer 115 is a network accessible system that serves web pages, content, and applications to other parties. The consumer 115 can serve its own content in addition to content stored on the producers 120, 125. The consumer 115 presents a web interface to the user systems 105, 110 that utilizes applications stored both locally and on the producers 120, 125. The consumer serves pages that utilize remote portlets on the producers through proxy portlets and allow the consumer to utilize the remote portlets' functionality. The proxy portlets are references to remote portlets that are stored within the web pages on the consumer that cause the portlets to appear within the consumer web pages.

During a registration phase, the consumer 115 registers with a producer 120. In one embodiment, the producer 120 identifies each consumer 105, 110 with a unique handle that enables the producer 120 to identify what portlets are available to a particular consumer. In alternative embodiments, the consumer does not register with the producer 120. The producer can provide a service description to the consumer 115 that indicates properties of the producer 120 and lists the available portlets that are stored on the producer 120. During a description phase, the producer 120 also provides a Web Services Description Language (WSDL) file indicating data types and message protocols to be used for interacting with the producer 120. This process is described in greater detail with respect to FIG. 2.

When a user system 105 establishes contact with the consumer 115, the consumer 115 aggregates pages, and stores proxy portlets in the pages that access remote portlets on the producer 120. The user system 105 can send a page request to the consumer 115 for a page that includes remote portlets that utilize the producer. When such a request is received by the consumer 115 from the user system 105, the consumer 115 sends a request for the data that appears in the page to the producer 120. The producer 120 returns the data, which the consumer 115 integrates into a single user interface and presents to the end user system 105.

Figure 2:
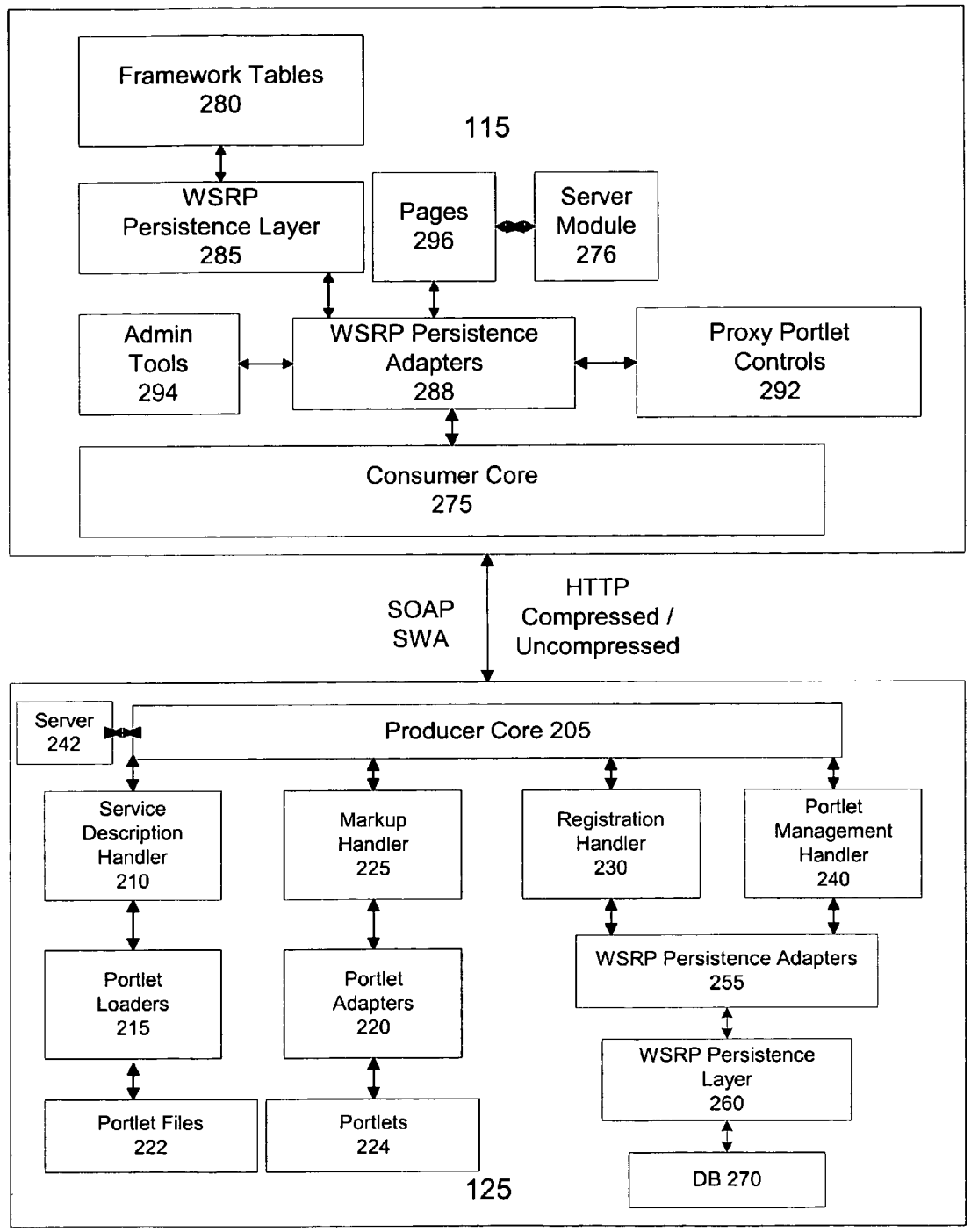
FIG. 2 is a block diagram illustrating another view of a consumer and a producer architecture.

FIG. 2 is a block diagram illustrating a more detailed view of a consumer 115 and a producer 125 in an embodiment. The producer 125 includes a producer core 205, a service description handler 210, portlet loaders 215, portlet adapters 220, portlet files 222, a markup handler 225, a registration handler 230, a portlet management handler 240, WSRP persistence adapters 255, persistence layers 260, one or more portlets 224, a server module 242, and a database (DB) 270.

The producer core 205 is an application such as a servlet that is configured to reside on the producer 125 and communicates with the consumer 115. The producer core 205 generates the WSDL files that indicate the parameters of communication between the producer 125 and the consumer 115 and transmits a file to the consumer 115 or otherwise provides the parameters to the consumer 115. These parameters can include data types and messaging protocols and can be pre-configured or user-selected.

The producer 205 additionally includes a service description handler 210. The service description handler 210 is responsible for providing a listing of portlets 224 that are available to consumers. The service description handler can provide the portlets in the form of individual portlets or in the form of pages containing portlets.

The service description handler utilizes the portlet loaders 215 to load the portlet files 222. The portlet files 222, which define the available portlets, are either portlet files or files created from a deployment descriptor such as a portlet.xml file. In some embodiments, the portlet loaders 215 include separate loaders for different types of portlets such as Java Page Flow (JPF) portlets, Struts portlets, Java Specification Request (JSR) 168 base portlets, and Java portlets. Struts portlets are portlets that utilize the Struts framework layer from the Apache Software Foundation. JPF portlets are portlets that utilize Page Flows to separate interface content from navigation control and other functional logic. In some embodiments, the JPF portlets on the producer can support nested page flows. Nested page flows are page flows that can be utilized temporarily without discarding a currently executing page flow. While the above portlets types are used as examples throughout this application, it should be understood that any portlet type is supported.

The service description handler 210, through the producer core 205 returns to the consumer 115 a set of available portlets in the form of an array of PortletDefinition classes or some other format. The PortletDefinition classes include a portletHandle identifier that identifies the portlet and modes, states, MIME types, a title, and a description for each portlet. Other information can also be provided.

A registration handler 230 registers consumers with the producer 125 so that the consumers can access portlets on the producer 125. The registration process entails the consumer 115 providing certain identification information to the producer 125. In some embodiments, the producer does not register the consumer. The consumer registration information can be stored in the database 270 through the persistence adapters 255 and persistence layer 260.

The portlet management handler 240 is responsible for storing, modifying, and retrieving portlet preferences and modifying or deleting portlets. The WSRP persistence adapters 255 are configured to receive requests to generate, modify, and read information stored in the database 270 from the registration handler 230 and portlet management handler 240. In one embodiment, the WSRP persistence adapters 255 include separate adapters for the registration handler 230 and the portlet management handler 240. The persistence layer 260 manages access to the database 270 by representing data in the database as objects, and allows particular data types to be accessed as such without requiring that the accessing entity have any knowledge about how said data is stored in the database. When a request to modify data, such as modifying the registration information of a consumer is received from the registration handler 230 through its persistence adapter 255, the persistence layer 260 receives the request in the form of an object modification request. The persistence layer 260 locates the various instances in the database 270 associated with the registration information and modifies them appropriately.

The markup handler 225 is responsible for processing markup requests (requests for the visual representation of the portlets within the page) for the portlets 224. When a request from a user system is received at the consumer, for example, a page is loaded that utilizes a remote portlet, the consumer 115 requests the appropriate render data from the producer. This request includes an identity of the portlet and a listing of capabilities of the user system. The markup handler 225 receives this request and determines an appropriate portlet adapter 220 to access the referenced portlet. The portlet adapters 220 are adapters that enable portlets 224 to be accessed as remote portlets. The portlet adapters can include portlet adapters for multiple portlet types, such as JPF, Java, JSR168, and Struts portlets. In some embodiments, a portlet adapter can comprise a Java Archive (JAR) file that is inserted into a producer to enable it to interact with remote consumers in a manner similar to how the portlet would interact with a local portal.

A server module 242 generates a user interface layer that enables a user selecting a portlet on a displayed page on a producer portal to obtain configuration information for utilizing the portlet as a remote portlet. This information can be obtained by selecting the portlet with a mouse, dragging the portlet to an email window or web browser window, or through some other means such as a voice interface or touch-screen. In some embodiments, the server module performs other portal display/management functions as well.

The consumer 115 includes a consumer core 275 that manages communication with the producer 125, one or more persistence adapters 288, administration tools 294, proxy portlet controls 292, a WSRP persistence layer 285, one or more pages 296 that reference the remote portlets 224 through included proxy portlets, a server module 276 and framework tables 280.

The consumer core 275 communicates with the producer core 205 using the Simple Object Access Protocol (SOAP) or another suitable protocol. In some embodiments, the consumer and producer cores use a variant of SOAP, known as SOAP With Attachments (SWA) that enables binary files to be attached to SOAP messages. In some embodiments, the producer and consumer use HyperText Transport Protocol (HTTP) and may use compression to reduce the size of transmitted data. The consumer core 275 receives a WSDL file from the producer 125 that it uses to configure its interaction with the producer 125. While in the present embodiment a file is used, in alternate embodiments, the configuration information can be provided in any one of a variety of different formats.

The framework tables 280 store information about the portlets available on the producer 125 (and other portlets) that is received from the service handler 210 of the producers. This information can include identifying information for the portlets, identifying information for the producer 125, capacities of the producer 125, and the types of functionality provided by the portlets. The framework table 280 also can include information about instances of proxy portlets stored on the consumer 115. When a portlet is first identified during registration/discovery a proxy portlet control 292 is created for the proxy that can be used to configure how the proxy is utilized on the consumer side.

A set of administration tools 294 enable a user or administrator of the consumer to create web pages 296 that access the remote portlets on the producer. The administrative tools insert a proxy portlet associated with a remote portlet on the producer into a created page 296 in a location that would normally refer to a portlet local to the consumer.

A server module 276 generates a user interface layer that enables a user selecting a section on one of the pages 296 to receive configuration information for utilizing a portlet on the producer 125 as a remote portlet. This information can be obtained by selecting a portlet 125 on the producer with a mouse and dragging the portlet to one of the pages 296 or through some other means such as a voice interface, touch-screen interface, or custom means. In some embodiments, the server module 276 performs other portal display/management functions as well.

A persistence layer 285 enables the admin tools and the proxy portlet controls 292 to store information about proxy portlet instances, including configuration information through their respective persistence adapters 288. This information can be retrieved, created, or modified by submitting actions to be performed on data objects to the persistence layer 285. The persistence layer 285 receives the actions, locates the data corresponding to the objects on the framework tables 280 and retrieves and/or modifies the tables accordingly.

When a user system attempts to render a page 296 on the consumer that includes one of the remote portlets 224, the consumer 115 transmits a GetMarkup request to the producer 125 to obtain the rendered content that should appear in the page. The request includes a handle for the portlet and capabilities of the client on the user system 105. The producer 125 utilizes one of the portlet adapters 220 to obtain the rendered content for the page from the portlet and returns the content to the consumer 115, which renders the page.

If a user system initiates an interaction with a page utilizing a remote portlet, for example by submitting a form, the consumer 115 sends to the producer the handle for the portlet, the form data storing the information stored on the form, query data indicating a requested response from the portlet, and any uploaded information. The producer 125 utilizes one of the portlet adapters 220 to submit this information to the portlet as if it had been submitted locally to the portlet. The portlet processes the request and changes its current mode/window state in response. The mode/window state indicates a state/mode for the window displaying the portlet, such as minimized, maximized, hidden, or normal.

The producer then returns to the consumer the new window state and a new navigational state for the portlet indicating a new page to be rendered on the main page on the consumer 115. When the consumer 115 subsequently requests markup, this new page, which presumably includes the response to the submitted form, is displayed inside the viewed portal page on the consumer.

In various embodiments, the producer system 125 utilizes templates for various types of Uniform Resource Locators (URLs). The templates include embedded fields for different types of information to be provided by the producer or consumer. When URLs are passed between the producer and the consumer, they may be rewritten by the consumer or producer to reflect differences in how the URLs would be accessed from either system. For example, URL designed to be utilized by the producer might not include the domain of the producer and would only include a location in a local file system. The consumer could rewrite such a URL with a global address that included the domain of the producer. Alternately, when the consumer submits a markup or other page request to the producer, it embeds blank fields into the URL for information such as markup state, window state, interaction state, and other information. The producer then rewrites the URL with this information included.

In some embodiments, page flow portlets and struts portlets can interact directly with a user system rather than working through the consumer. As mentioned above, the producer can utilize a URL writing framework based on templates. When portlets are interacting directly with a user, one set of templates is used. When portlets interact through a consumer a separate set of templates are used. For example, when a portlet is being accessed directly by a user, a template is used that does not require rewriting by the consumer.

Figure 3:
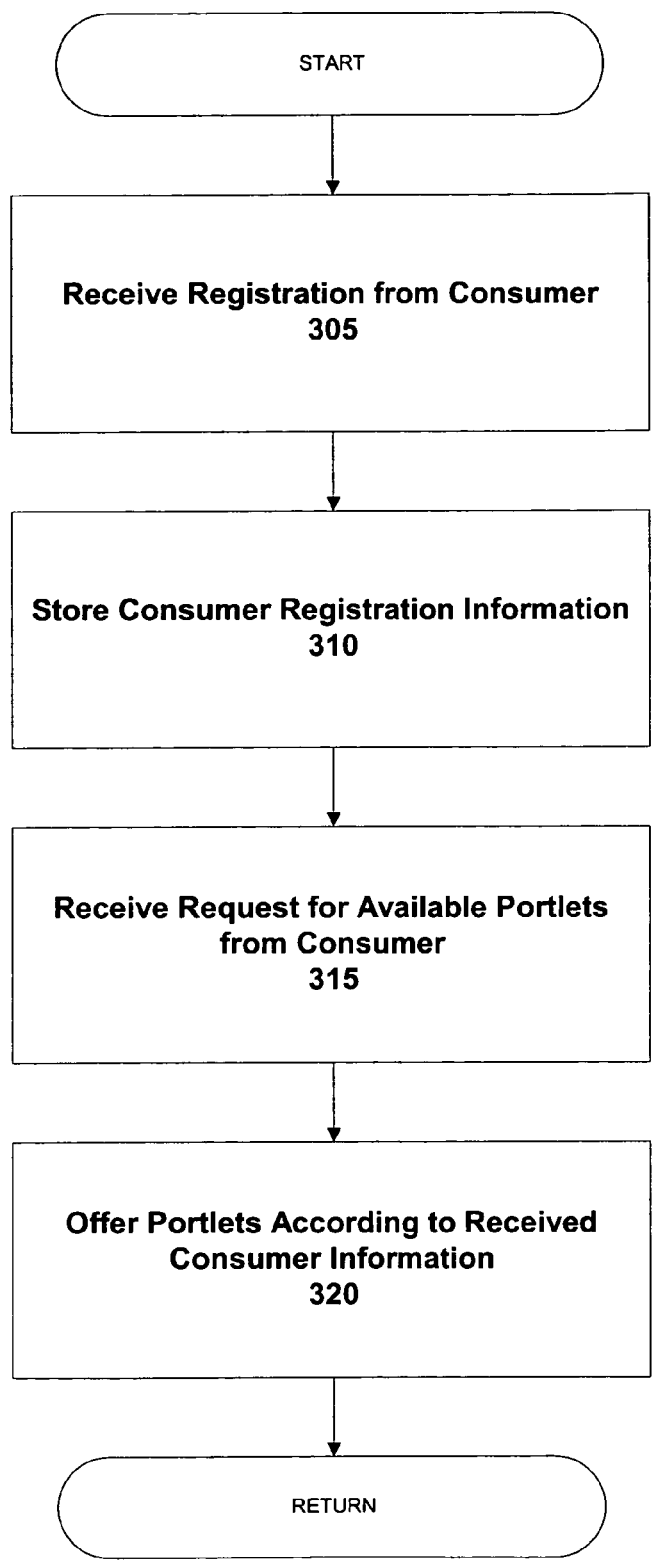
FIG. 3 is a flow chart illustrating an overview of a process for providing applications to a remote system.

FIG. 3 is a flow chart illustrating an overview of an embodiment of a process for providing applications to a remote system. In one embodiment this process is performed by a WSRP producer 125 that provides one or more portlets that can be presented on pages in a remote consumer system. In block (305), the producer receives registration from the consumer. The consumer provides some sort of identifier (e.g. hostname, WSDL identifier, IP address) to the producer to accomplish the registration. Additionally, the consumer provides one or more additional registration values (e.g., owner, location, domain, country, username/password) that are used to determine its ability to consume portlets on the producer.

The producer generates a unique identifier for the consumer and provides it to the consumer. In one embodiment, the identifier is a registration "Handle." In future interactions, this consumer provides this value to the producer with each communication so that the producer can identify the consumer.

In block (310) the producer stores the registration information for future use. In some embodiments, the consumer identification information is stored in the database 270. It can be accessed when the consumer requests portlets (315). In one embodiment, the producer maintains a list of entries organized by the registration Handle indicating the registration values for each consumer.

In block (320) the producer provides a list of available portlets according to the registration values. In one embodiment, this information is provided in the form of a WSRP service description document. In one embodiment, the producer sequentially checks each available portlet and determines whether to offer it to the consumer according to the registration values. This process is described in greater detail with respect to FIG. 4.

Figure 4:
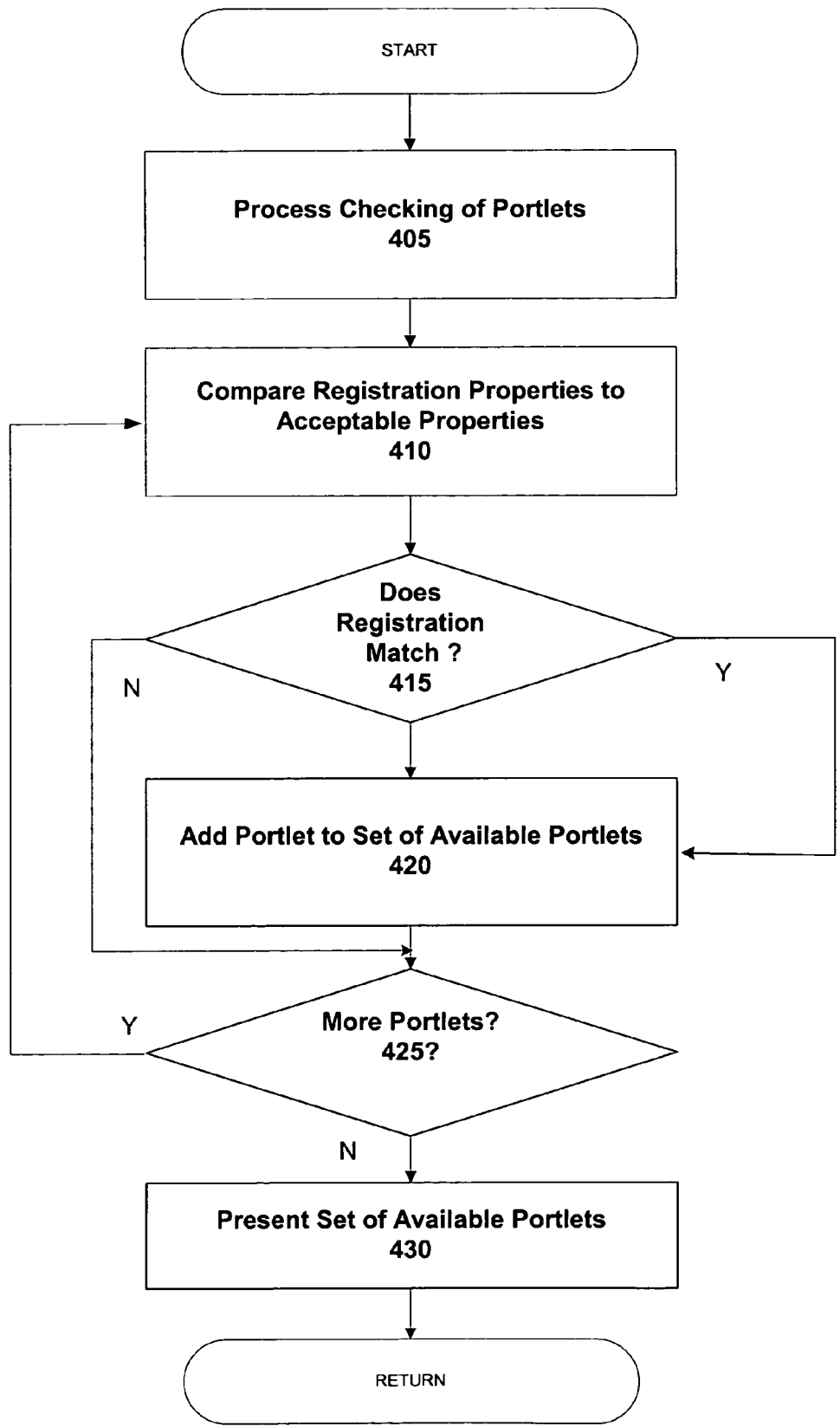
FIG. 4 is a flow chart illustrating one embodiment of a process for generating a list of available applications.

FIG. 4 is a flow chart illustrating one embodiment of a process for generating a list of available applications. In one embodiment this process is performed by a WSRP producer. This process can be performed when a consumer submits a request for available portlets or at some other stage. In block (405) the system processes checking of portlets. In one embodiment, the producer sequentially checks each portlet that can be made available for remote consumption.

In block (410) the producer compares the consumer registration values to those for a portlet. In some embodiments, the producer assigns the consumer a role value according to the registration values provide by the consumer. For example, if the consumer provided registration values a, b, and c the producer could assign role D to the consumer and if the consumer provided registration values m, n, and o, the producer could assign role P to the consumer. The producer could then compare the role value for the consumer rather than the individual registration values. The portlet is associated with a set of registration values or roles for which the portlet can be consumed. The portlet can also maintain a set of registration values and roles for more advanced usage, such as modification of the portlet or limitations on the usage of the portlet.

In block (415) the producer determines whether the registration values or role values provided by the consumer match those role values or entitlements that enable use of the portlets. If the values do not match, the process moves to block (425). If the values match, the portlet is added to the set of available portlets in block (420). In some embodiments according to the registration values the portlets can stored with certain limitations. These limitations can include whether the portlets can be modified/customized and a number of portlet uses that are available or times that the portlet can be used. Thus, certain registration values can enable the portlet to be consumed, but not modified or customized.

In block (425), the producer checks for more portlets are available to be added to the set of consumable portlets. If more portlets are available the process moves to block (410) for the next available portlet. If no other portlets remain, in block (430) the system presents a set of available portlets to the consumer. In some embodiments the portlets are provided as part of a service description response.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A method for controlling access to resources, the method comprising:

deploying a plurality of applications to a producer system wherein each of the applications are capable of being presented on pages of one or more portals that are each stored on a computer readable storage medium in a plurality of remote consumer systems, while each application resides locally at the producer system;

receiving by the producer system, from one of the remote consumer systems, a plurality of registration values for that remote consumer system;

assigning a handle to the remote consumer system by the producer system, wherein the handle is a unique identifier used in subsequent communications between the producer system and that remote consumer system;

receiving a request for available applications at the producer system from the remote consumer system; and determining, by the producer system, for each one of the applications, whether that application can be made available to the remote consumer system to be consumed or modified by the remote consumer system, according to the registration values received, wherein determining includes
comparing the registration values with the applications to determine if the registration values match the applications,
if the registration values match, then adding the applications to a set of available applications, and
providing the set of available applications in a response to the remote consumer system that integrates and presents said applications to an user system.

2. The method of claim 1, wherein deploying at least one application capable of being presented on at least one page in at least one remote consumer system while residing locally comprises:
deploying at least one portlet in the at least one remote consumer system.

3. The method of claim 1, wherein receiving from one of the at least one remote consumer systems, at least one registration value compromises:
receiving the at least one registration value from a Web Services for Remote Portlets (WSRP)consumer.

4. The method of claim 1, wherein receiving from one of the at least one remote consumer systems, at least one registration value comprises:
receiving at least one registration value, the registration value including an identity of a user of the remote consumer system.

5. The method of claim 1, wherein receiving from one of the at least one remote consumer systems, at least one registration value comprises:
receiving the at least one registration value from a third party authentication system.

6. The method of claim 1, wherein determining, for each one of the at least one applications, whether the application can be made available to the at least one remote consumer system according to the registration value received comprises:
determining permissions for each of the at least one applications according to the registration values.

7. The method of claim 1, wherein determining, for each one of the at least one applications, whether the application can be made available to the at least one remote consumer system according to the registration value received enables:
controlling access to the at least one application by the at least one remote consumer system in a central location.

8. The method of claim 1, further comprising:
serving at least one application to at least one remote consumer system responsive to request by the remote consumer system, when it has been determined that the application can be made available to the at least one remote consumer system according to the registration value.

9. A machine readable storage medium comprising instructions that when executed by a processor cause a system to:
deploy a plurality of applications to a producer system wherein each of the applications are capable of being presented on one or more pages of a portal in a plurality of remote consumer systems, while each application resides locally at the producer system;
receive by the producer system from one of the remote consumer systems, plurality of registration values for that remote consumer system;
assign a handle to the remote consumer system by the producer system, wherein the handle is a unique identifier used in subsequent communications between the producer system and that remote consumer system;
receive a request for available applications at the producer system from the remote consumer system; and
determine, by the producer system, for each one of the applications, whether that application can be made available to the remote consumer system to be consumed or modified by the remote consumer system according to the registration value received, wherein determining includes
comparing the registration values with the applications to determine if the registration values match the applications,
if the registration values match, then adding the applications to a set of available applications, and
providing the set of available applications in a response to the remote consumer system that integrates and presents said applications to an user system.

10. The machine readable storage medium of claim 9, wherein the instructions for causing a system to deploy at least one application capable of being presented on at least one page in at least one remote consumer system while residing locally include instructions for causing the system to:
deploy at least one portlet in the at least one remote consumer system.

11. The machine readable storage medium of claim 9, wherein the instructions for causing a system to receive from one of the at least one remote consumer systems, at least one registration value include instructions for causing the system to:
receive the at least one registration value from a Web Services for Remote Portlets (WSRP) consumer.

12. The machine readable storage medium of claim 9, wherein the instructions for causing a system to receive from one of the at least one remote consumer systems, at least one registration value include instructions for causing the system to:
receive at least one registration value, the registration value including an identity of a user of the remote consumer system.

13. The machine readable storage medium of claim 9, wherein the instructions for causing a system to receive from one of the at least one remote consumer systems, at least one registration value include instructions for causing the system to:
receive the at least one registration value from a third party authentication system.

14. The machine readable storage medium of claim 9, wherein the instructions for causing a system to determine, for each one of the at least one applications, whether the application can be made available to the at least one remote consumer system according to the registration value received include instructions for causing the system to:
determine permissions for each of the at least one applications according to the registration values.

15. The machine readable storage medium of claim 9, wherein the instructions for causing a system to determine, for each one of the at least one applications, whether the application can be made available to the at least one remote consumer system according to the registration value received include instructions for enabling the system to:
control access to the at least one application by the at least one remote consumer system in a central location.

16. The machine readable storage medium of claim 9, further comprising instructions for causing the system to:

serve at least one application to at least one remote consumer system responsive to request by the remote consumer system, when it has been determined that the application can be made available to the at least one remote consumer system according to the registration value.

17. A system for controlling access to resources on a computer readable storage medium, the system comprising:
- a producer system executing on a computer including a storage medium and processor operating thereon;
- a plurality of applications capable of being presented on one or more pages of a portal in one or more remote consumer systems while residing locally on the producer system; and
- wherein the producer system is configured to
  - receive a plurality of registration values from a remote consumer system for that remote consumer system from among the one or more remote consumer systems,
  - assign a handle to the remote consumer system by the producer system, wherein the handle is a unique identifier used in subsequent communications between the producer system and that remote consumer system;
  - receive a request for available applications at the producer system from the remote consumer system; and
  - determine, for each application at the producer system, whether that application can be made available for use in the remote consumer system to be consumed or modified by the remote consumer system, according to the registration values, wherein determining includes
  - comparing the registration values with the applications to determine if the registration values match the applications,
  - if the registration values match, then adding the applications to a set of available applications, and
  - providing the set of available applications in a response to the remote consumer system that integrates and presents said applications to an user system.

* * * * *

UNITED STATES PATENT AND TRADEMARK OFFICE
CERTIFICATE OF CORRECTION

PATENT NO. : 7,647,644 B2
APPLICATION NO. : 11/169557
DATED : January 12, 2010
INVENTOR(S) : Subrahmanyam Allamaraju et al.

It is certified that error appears in the above-identified patent and that said Letters Patent is hereby corrected as shown below:

In column 1, line 21, delete "Ser. No. 11/170,884entitled" and insert -- Ser. No. 11/170,884, entitled --, therefor.

In column 9, line 23, in claim 3, delete "compromises:" and insert -- comprises: --, therefor.

In column 9, line 66, in claim 9, before "plurality" insert -- a --.

Signed and Sealed this

Fourteenth Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,647,644 B2 | Page 1 of 1 |
| APPLICATION NO. | : 11/169557 | |
| DATED | : January 12, 2010 | |
| INVENTOR(S) | : Allamaraju et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 938 days.

Signed and Sealed this

Sixteenth Day of November, 2010

David J. Kappos
*Director of the United States Patent and Trademark Office*